United States Patent [19]

Aceti

[11] Patent Number: 5,097,877
[45] Date of Patent: Mar. 24, 1992

[54] MACHINE TOOL WITH AUTOMATIC TOOL-CHANGING DEVICE

[75] Inventor: Pietro Aceti, Bergamo, Italy

[73] Assignee: C.M.S. S.p.A., Bergamo, Italy

[21] Appl. No.: 625,226

[22] Filed: Dec. 10, 1990

[30] Foreign Application Priority Data

Dec. 12, 1989 [IT] Italy .................. 7127/89[U]

[51] Int. Cl.$^5$ .............................................. B27C 9/00
[52] U.S. Cl. ...................................... 144/1 A; 29/568
[58] Field of Search .............................. 29/39, 40, 568; 144/1 R, 1 A

[56] References Cited

U.S. PATENT DOCUMENTS

| | | | |
|---|---|---|---|
| 4,761,877 | 8/1988 | Rupp | 29/568 |
| 4,802,274 | 2/1989 | Petrof et al. | 29/568 |

*Primary Examiner*—W. Donald Bray
*Attorney, Agent, or Firm*—McGlew & Tuttle

[57] ABSTRACT

The invention relates to a machine tool with a revolving head (11) used particularly for working on wood. It is fitted with an automatic tool-changing device (14) able to remove and fit a tool from and on each spindle of said head when the head is in a prearranged position, away from the piece to be worked on. The tool-changing device (14) is fitted on the frame (12) carrying the revolving head (11) above the head itself.

6 Claims, 2 Drawing Sheets

MACHINE TOOL WITH AUTOMATIC TOOL-CHANGING DEVICE

FIELD OF THE INVENTION

The present invention relates to machine tools, in particular but not exclusively for woodwork, and especially to a machine tool with a revolving head holding a variety of tools.

SUMMARY AND OBJECTS OF THE PRESENT INVENTION

The main object of the invention is to fit the above mentioned machines with a tool-changing device in a completely new way, for a quick and automatic change of each tool when not in use and in a prearranged position, that being, due to the rotation of the tool-holding head, away from the piece to be worked on.

Another object of the invention is to propose a tool-changing device which is particularly simple and useful so as to allow for a more practical use of the above mentioned machine tools. The tool-changing device can move in such a way as to allow for the removing of a tool from the head and the fitting of a different one.

The objects of the invention are realized by having a machine tool with a revolving tool head. The revolving tool head has a plurality of spindles for holding the individual tools in a work position and in a tool-changing position. While one spindle is holding a tool in the work position, another spindle is holding a tool in the tool-changing position. Also mounted on the machine tool is an arm moveable in a first direction, and on this arm a slide is moveable in a second direction, the first and second directions being substantially perpendicular. On the slide, a revolving support is mounted which contains clamping means for fitting and removing tools from the spindles. The clamping means is brought into the tool-changing position by movements of the revolving support, the slider, and the arm. The tool-changing position is at a location spaced from the working position allowing tool-changing operations to be performed while the tool in the working position is also operating.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
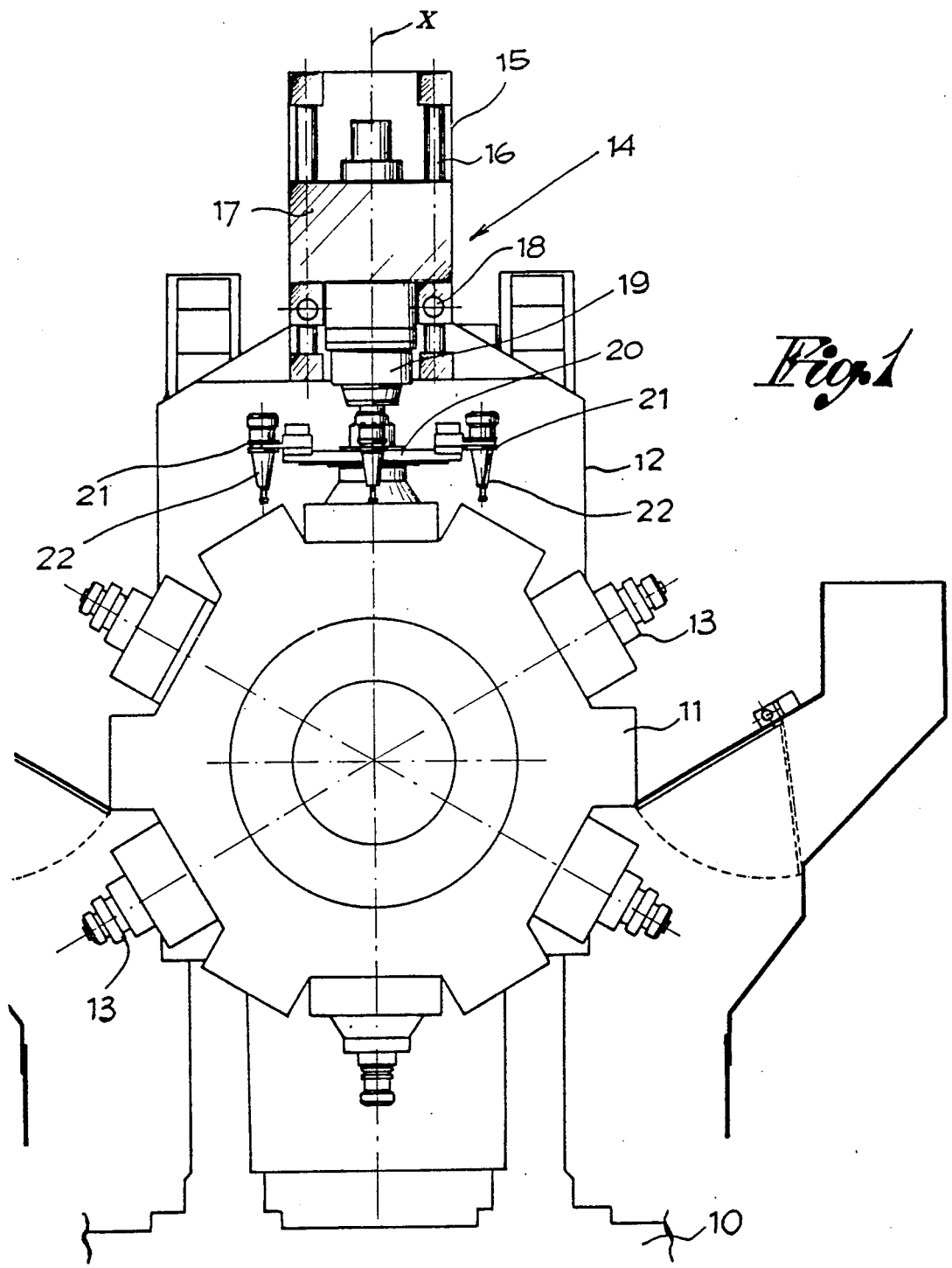
FIG. 1 is a tool-holding head provided with a tool-changing device viewed from the front.

In the drawing there is a portion of a machine tool (10) fitted with a revolving head (11). This is fitted so as to rotate on a frame (12) and is equipped with a variety of spindles (13) for different tooling.

Figure 2:
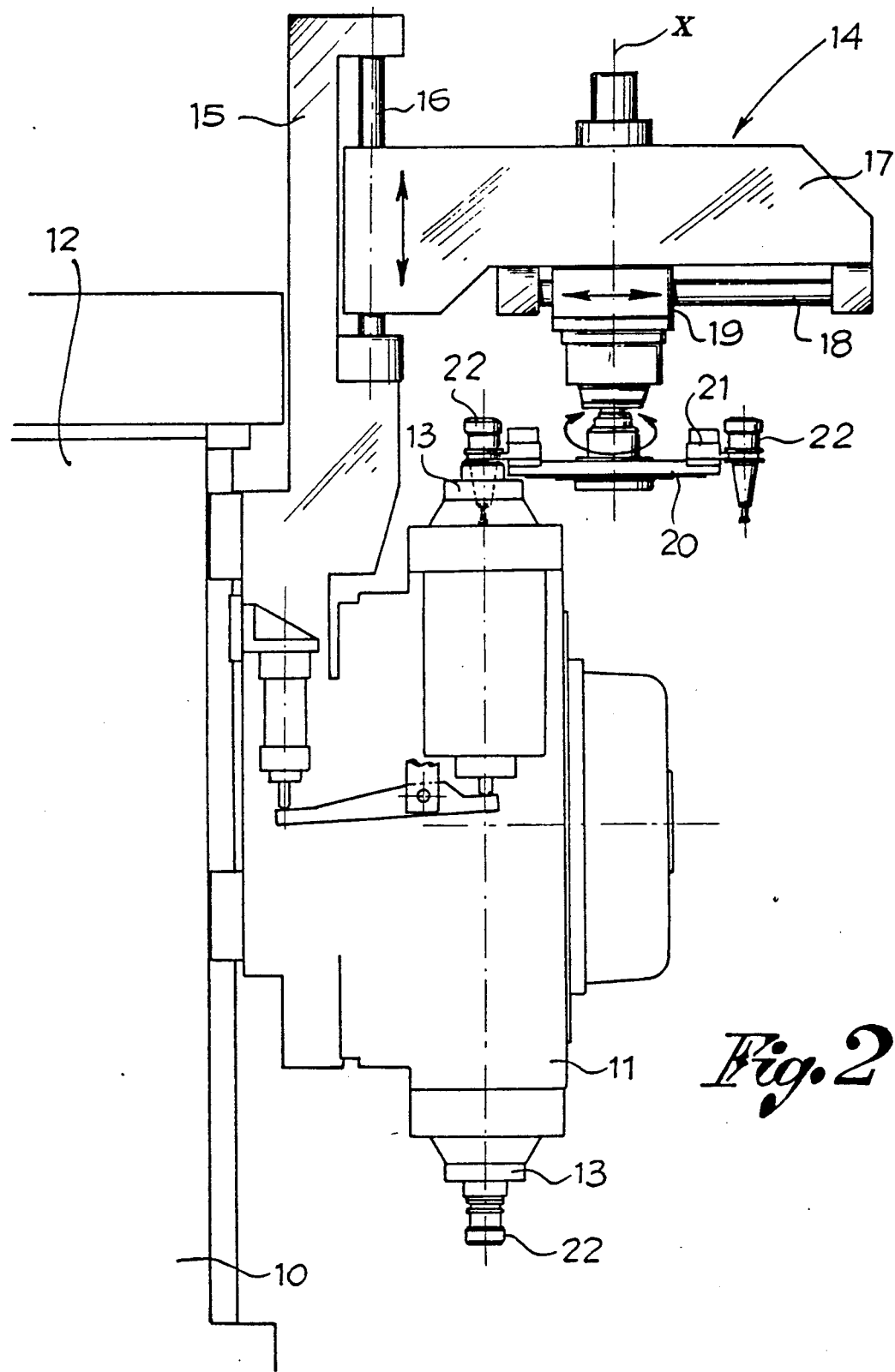
FIG. 2 is a side view of FIG. 1.

The machine is provided with a tool-changing device (14) placed above the head (11). In the attached drawing this device (14) comprises: a stationary support (15) fixed to the machine frame (12) and fitted with a pair of vertical posts (16); a horizontal arm or bracket (17) which is movable on the vertical posts (16) and in turn carries two horizontal slide bars (18); a slide (19) which is movable along the horizontal slide bar (18) on the arm (17) and carrying a revolving support (20) which rotates round a vertical axis (x). The arrows in FIG. 2 show the possible movements of the arm or bracket (17) on the stationary support (15), of the slide (19) of the arm (17) and the revolving support (20) on the saddle. These movements are controlled by appropriate pneumatic or electric actuators not shown, but easily looked up.

Clamps (21) for the removing and fitting of the tools (22) on the head (11) are mounted on the revolving support (20).

Infact, due to the movement of the parts (17, 19 and 20) of the device (14), each clamp (21) can be positioned towards, and moved on, the head in order to remove to tool from an unused spindle, usually the one pointing upwards, and bring and fit another tool to the spindle. By therefore preparing the tool changing-device in accordance with the order of use of the tools on the machine head (11) for certain tooling, it is possible to automatically change the tools without ever stopping the machine, thus increasing its efficiency and productivity.

I claim:

1. A machine tool comprising:
a machine frame;
a tool head mounted on said machine frame, said tool head having a plurality of spindles, said tool head being revolvable for positioning each of said spindles into a work position;
a support fixed to said machine frame;
an arm movably mounted in a first direction on said support;
a slide movably mounted on said arm in a second direction substantially perpendicular to said first direction;
a revolving support mounted on said slide, said revolving support revolving about an axis substantially parallel to a plane of rotation of said tool head;
clamping means on said revolving support for fitting and removing a tool from one of said spindles when one of said spindles is in a tool-changing position which is spaced from said work position, said clamping means moving into said tool-changing position by said arm, said slide, and said revolving support.

2. A machine tool in accordance with claim 1, wherein:
said tool head revolves on a horizontal axis;
said arm is moveable in a vertical direction;
said slide moves in a horizontal direction substantially parallel to said horizontal axis.

3. A machine tool in accordance with claim 2, wherein:
said arm moves on vertical slide posts; and
said slide moves on horizontal slide bars.

4. A machine tool in accordance with claim 1, wherein:
said revolving support has a plurality of said clamping means.

5. A machine tool in accordance with claim 1, wherein:
said clamping means can fit and remove a plurality of said tools from said one of said plurality of spindles in said tool-changing position while another one of said plurality of spindles is operating in said working position.

6. A machine tool in accordance with claim 1, wherein:
said tool-changing position is substantially opposite said work position.

* * * * *